April 20, 1937.  J. EGGERT ET AL  2,077,518
MANUFACTURE OF LENTICULAR SOUND FILM
Filed June 4, 1934
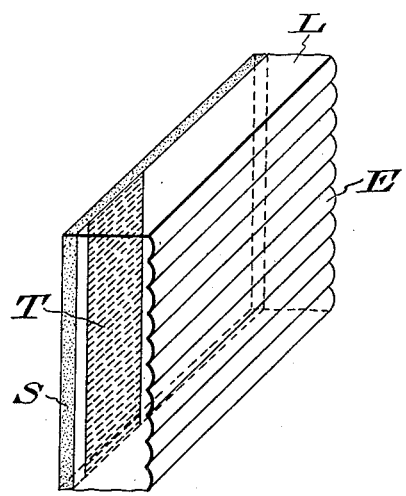
Inventors:
John Eggert
Gerd Heymer
By Potter Pierce & Scheffler
their Attorneys.

Patented Apr. 20, 1937

2,077,518

UNITED STATES PATENT OFFICE 2,077,518

MANUFACTURE OF LENTICULAR SOUND FILM

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application June 4, 1934, Serial No. 729,016
In Germany June 3, 1933

3 Claims. (Cl. 274—46)

(Granted under the provisions of sec. 14, act of March 2, 1927; 357 O. G. 5)

Our present invention relates to the manufacture of lenticular sound films and more particularly to such films provided with a sound record made according to the variable density method.

One of its objects is a method of reproducing a lenticular film bearing a sound record made according to the variable density method. Another object is a lenticular sound film provided with a sound record of the variable density type. Further objects will be seen from the detailed specification following hereafter.

It is generally required that in a lenticular film having a sound track there should be on the face of the film which does not carry the track a smooth strip opposite the track. Such a smooth strip has been provided either by omitting to emboss that portion of the film when lenticular elements are being produced, or by smoothing out the lenticular elements on the embossed surface along a strip opposite the sound track. Difficulties connected with these modes of providing the smooth strip have led to attempts to emboss the film longitudinally, for the lenticular elements would not then have an adverse effect on the reproduction of the sound by the sound track.

The present invention is based on the discovery that in the reproduction of a lenticular film having a sound record of the variable density type and lenticular elements running parallel with the sound track lines that is to say parallel with an image of the slot as recorded on the film, the sound record is correctly reproduced if the frequency set up by the lenticular elements exceeds the limit of audibility.

For applying this discovery the film is reproduced under such conditions that in one second at least 10,000 lenticular elements pass the sound reproduction gate. Either the speed of travel of the film or the size of the lenticular elements may be so selected as to ensure the passage of the required number of lenticular elements per second past the gate.

With normal rate of travel of the film and with lenticular embossings each of 45µ in breadth, the frequency produced is about 10,000 cycles, per second, that is to say at the limit of audibility. Hence, either at greater speed of travel or with embossings of breadth smaller than 45µ (1µ=1/1000 mm.), the frequency will exceed 10,000 cycles per second and will no longer be audible. In other words more than 10,000 lenticular elements will pass the gate per second and the reproduction of the sound is no longer damaged for the audience by the embossings.

There is a certain difference in the reproduction dependent on whether the illumination of the film is from the side carrying the emulsion or from the embossed side, that is to say whether the illuminating rays fall first on the emulsion or first on the embossings. The dispersion caused by the lenticular embossing is stronger when the illumination is from the embossed side, whereas when it is from the emulsion side the dispersion is less and also the tendency for a part of the light to fall outside the limits of the photo-electric cell. It is true that the receiving surface of the photo-electric cell is generally large enough to receive even the rays dispersed by the lenticular elements, but it is not a matter of indifference on what particular part of the receiving surface the rays fall. The regions of the cell which are illuminated only periodically have, in certain circumstances, a sensitivity somewhat different from that of the regions which receive the same amount of light uninterruptedly; thus in spite of illumination from the emulsion side, a disturbing noise can be heard if the frequency produced by the embossings is too low.

The term "lenticular film having its lenticular elements running transversely of the edges of the film" as used in the claims includes lenticular films having their lenticular elements running perpendicularly to the edges of the film and films having their lenticular elements running at an angle down to 45° with relation to the edges of the film.

A film in accordance with the invention is illustrated in the accompanying drawing in which L is the film proper, T is the sound track, E are the lenticular elements and S is the light sensitive layer.

What we claim is:

1. In the reproduction of lenticular films having a sound track of the variable density type and lenticular elements running parallel with the sound track lines and transversely of the edges of the film, the improvement which consists in advancing the film at such a speed that in each second at least 10,000 lenticular elements pass the sound reproduction gate.

2. A lenticular film having a sound track of the variable density type and lenticular elements running parallel with the sound track lines and transversely of the edges of the film, wherein the breadth of each lenticular element is less than 45μ.

3. In the reproduction of lenticular film having a sound track of the variable density type and lenticular elements running parallel with the sound track lines and transversely of the edges of the film, the improvement which consists in advancing the film at such a speed that in each second at least 10,000 lenticular elements pass the sound reproduction gate, and illuminating the sound record from the emulsion side of the film.

JOHN EGGERT.
GERD HEYMER.